US005634646A

United States Patent [19]
Miyaoh

[11] Patent Number: 5,634,646
[45] Date of Patent: Jun. 3, 1997

[54] METAL LAMINATE GASKET WITH COATING LAYER

[75] Inventor: Yoshio Miyaoh, Tokyo, Japan

[73] Assignee: Ishikawa Gasket Co., Ltd., Tokyo, Japan

[21] Appl. No.: 652,029

[22] Filed: May 21, 1996

[30] Foreign Application Priority Data

Jun. 1, 1995 [JP] Japan ................... 7-134853

[51] Int. Cl.$^6$ ................................. F16J 15/08
[52] U.S. Cl. ................... 277/235 B; 277/235 A
[58] Field of Search ................... 277/235 A, 235 B, 277/233, 236

[56] References Cited

U.S. PATENT DOCUMENTS

| | | |
|---|---|---|
| 4,834,399 | 5/1989 | Udagawa et al. . |
| 4,896,891 | 1/1990 | Udagawa ................ 277/235 B |
| 4,898,396 | 2/1990 | Udagawa ................ 277/235 B |
| 4,995,624 | 2/1991 | Udagawa et al. . |
| 5,058,908 | 10/1991 | Udagawa ................ 277/235 B |
| 5,076,595 | 12/1991 | Udagawa ................ 277/235 B |
| 5,213,345 | 5/1993 | Udagawa ................ 277/235 B |
| 5,240,261 | 8/1993 | Udagwa et al. ............. 277/235 B |
| 5,297,807 | 3/1994 | Udagawa ................ 277/235 B |
| 5,435,575 | 7/1995 | Udagawa ................ 277/235 B |

FOREIGN PATENT DOCUMENTS 0431227  6/1991  European Pat. Off. .

*Primary Examiner*—Scott Cummings
*Attorney, Agent, or Firm*—Kanesaka & Takeuchi

[57] ABSTRACT

A metal laminate gasket of the invention is used for an internal combustion engine having a cylinder bore and a fluid hole. The gasket is formed of first and second metal plates, and a coating layer situated between the first and second metal plates. The first plate has first and second holes corresponding to the cylinder bore and fluid hole. The first plate includes a main portion, a curved portion to define the first hole, a flange, and a first bead formed in the main portion to surround the first hole. The first bead projects toward the flange to be disposed above the flange. The second plate is situated under the main portion, and includes a third hole in which the curved portion is located, a fourth hole corresponding to the fluid hole, and a second bead surrounding the flange and projecting in a same direction as in the first bead. A third bead is formed on one of the first and second metal plates to seal around the fluid hole of the engine. The coating layer is formed outside the flange relative to the cylinder bore.

4 Claims, 1 Drawing Sheet

METAL LAMINATE GASKET WITH COATING LAYER

BACKGROUND OF THE INVENTION AND RELATED ART STATEMENT

The present invention relates to a metal laminate gasket with a coating layer to securely seal around holes of the engine, in particular a cylinder head gasket for securely sealing around cylinder bores and fluid holes.

An automobile engine has been developed to provide light weight and high power, while the engine lasts long without serious trouble, such as leaking of gas or fluid. In view of these requirements, a gasket to be installed in the engine must have light weight and seal properly around cylinder bores and fluid holes.

In view of these requirements, gaskets formed of two plates were proposed, for example U.S. Pat. Nos. 4,823,399 and 4,995,624 and Japanese Utility Model Publication (KOKOKU) No. 3-22539.

As shown in FIG. 3, a gasket as disclosed in U.S. Pat. No. 4,823,399 is formed of an upper plate 10 having a hole 11 for a cylinder bore and a hole 12 for a water hole, a lower plate 13 having a hole 14 for the cylinder bore and a hole 15 for the water hole, and coating layers 16 formed on both sides of the lower plate 13. The upper plate 10 includes a curved portion 10a and a flange 10b, which seal around the hole 11, while the lower plate 13 includes a bead 13a formed around the hole 15 and located inside the hole 12. In this gasket, when surface pressures around the cylinder bore or the water hole are changed, it is required to change a size of the curved portion 10a or the bead 13a, or the thickness of the plates 10 or 13.

In U.S. Pat. No. 4,995,624, although a wide surface pressure is formed around a cylinder bore by an embossed portion with a bead, the surface pressure around the cylinder bore is not easily regulated.

In view of the foregoings, the present invention has been made.

An object of the invention is to provide a metal laminate gasket, which can securely seal around cylinder bores and fluid holes.

Another object of the invention is to provide a metal laminate gasket as stated above, wherein the required surface pressures can be formed around the cylinder bores and fluid holes.

A further object of the invention is to provide a metal laminate gasket as stated above, wherein the plates for constituting the gasket can be easily assembled.

Further objects and advantages of the invention will be apparent from the following description of the invention.

SUMMARY OF THE INVENTION

A metal laminate gasket of the invention is used for an internal combustion engine having a cylinder bore and a fluid hole to be sealed. The gasket is basically formed of first and second metal plates.

The first metal plate includes a first hole corresponding to the cylinder bore of the engine, and a second hole corresponding to the fluid hole of the engine. The first metal plate is formed of a main portion extending substantially throughout an entire area of the gasket, a curved portion extending from the main portion to define the first hole, and a flange extending from the curved portion and situated under a part of the main portion. A first bead is formed in the main portion to surround the first hole. The first bead projects toward and disposed above the flange.

The second metal plate is situated under the main portion to extend substantially throughout the entire area of the gasket. The second metal plate has a third hole in which the curved portion is located, and a fourth hole corresponding to the fluid hole of the engine. The second metal plate further includes an inner portion situated around the third hole and disposed on the flange, and a second bead formed outside the inner portion and projecting in the same direction as in the first bead. The second bead surrounds the flange and projects downwardly beyond the flange.

The gasket of the invention further includes a third bead formed on one of the first and second metal plates to seal around the fluid hole of the engine, and a coating layer formed on at least one of the first and second metal plates at a side facing the other of the first and second metal plates. The coating layer is formed outside the flange relative to the cylinder bore.

Preferably, the third bead is formed on the second metal plate, and projects downwardly as in the first and second beads. The spring constant at the third bead is less than that at the second bead.

When the gasket is tightened, all the beads are compressed to securely seal around the respective holes. The first bead is substantially completely compressed to provide high surface pressure thereat. The second bead is compressed upto the height of the flange. Therefore, in case the sealing pressure at the first bead is lowered by plastic deformation of the first bead, the sealing pressure at the second bead is not lowered because of protection by the flange. Thus, the area around the cylinder bore is securely sealed by the first and second beads.

In the gasket, since the coating layer is not formed on the flange, coating flow by heat at the cylinder bore does not occur near the cylinder bore. Therefore, surface pressure around the cylinder bore is not lowered by the coating flow.

DETAILED DESCRIPTION OF PREFERRED EMBODIMENTS

Figure 1:
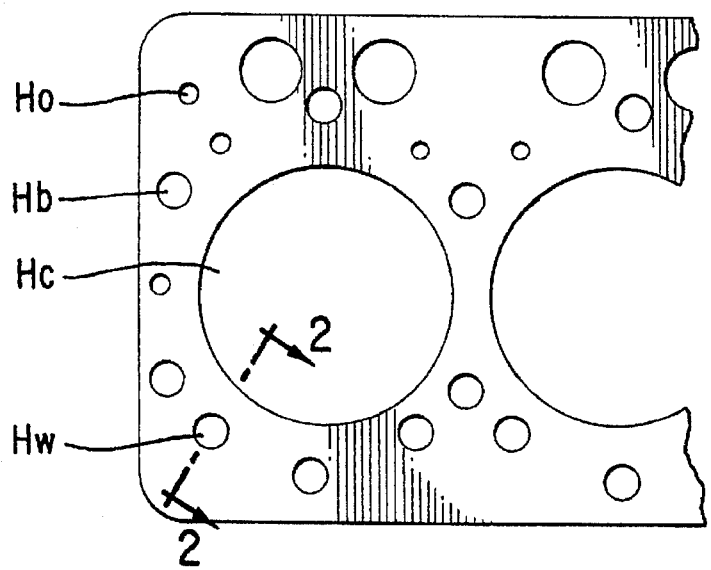
FIG. 1 is a plan view of a part of a metal laminate gasket of the invention.
Figure 2:
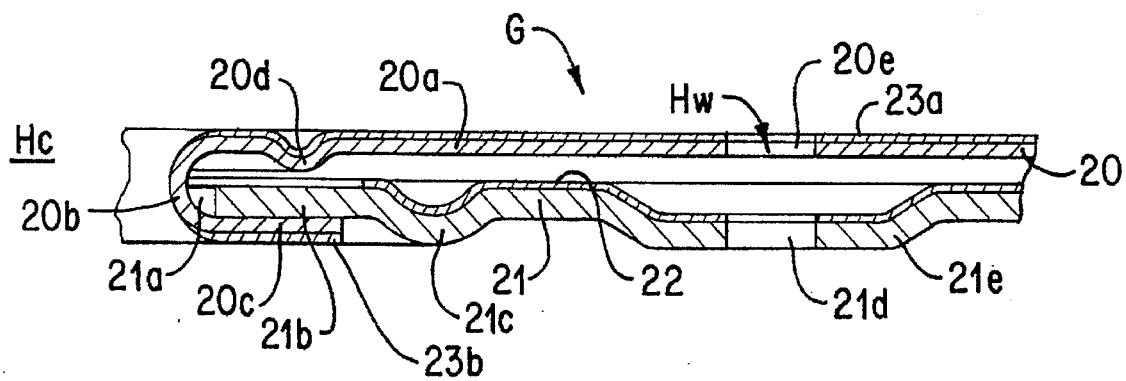
FIG. 2 is an enlarged sectional view taken along line 2—2 in FIG. 1.
Figure 3:
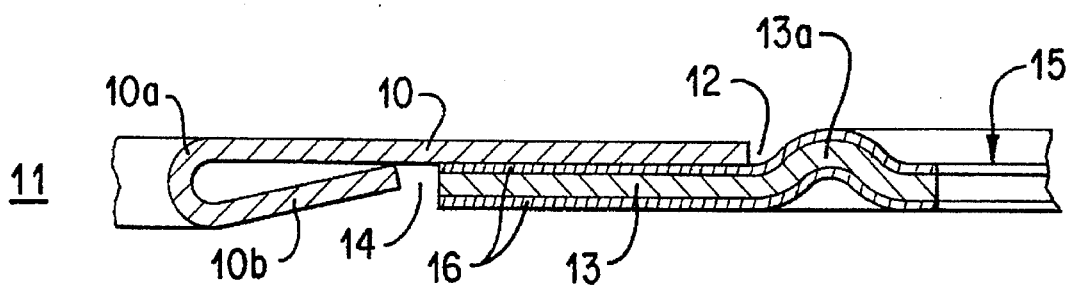
FIG. 3 is a sectional view, similar to FIG. 2, of a conventional metal laminate gasket.

With reference to FIGS. 1 and 2, a metal laminate gasket G of the invention is shown. The gasket G is a cylinder head gasket and includes a plurality of cylinder bores Hc, water holes Hw, oil holes Ho and bolt holes Hb, as in the conventional gasket.

The gasket G is formed of an upper metal plate 20, and a lower metal plate 21. The upper plate 20 includes a main portion 20a extending substantially throughout an entire area of the gasket, a curved portion 20b extending from the main portion 20a and defining the cylinder bore Hc, and a flange 20c extending from the curved portion 20b. The upper plate 20 further includes a bead 20d around the cylinder bore Hc, and a hole 20e for forming the water hole Hw. The bead 20d extends toward the flange 20c to be located above the flange 20c and provides a surface pressure around the cylinder bore Hc when the gasket G is tightened.

The lower plate 21 includes a hole 21a, an inner portion 21b formed around the hole 21a and located on the flange 20c, a bead 21c surrounding the inner portion 21b and extending in the same direction as in the bead 20d, and a hole 21d situated under the hole 20e. A bead or inclined wall 21e is formed around the hole 21d to provide a surface pressure around the water hole Hw when the gasket is tightened. The spring constant of the bead 21e is less than that of the bead 21c.

When the upper and lower plates 20, 21 are assembled, the bead 21c projects downwardly beyond the flange 20c. The bead 21c is not completely flattened by the flange 20c when the gasket is tightened, so that creep relaxation of the bead 21c is prevented.

A coating 22 is formed on the lower plate 21 except the inner portion 21b. When the gasket A is tightened, the coating 22 closely contacts the upper plate 20 to thereby prevent fluid from flowing between the upper and lower plates 20, 21. The coating 22 may be formed of or contain fluorine rubber, NBR, silicone rubber or epoxy resin. Since the coating 22 is not formed on the inner portion 21b, there is no coating flow near the cylinder bore Hc. Thus, lowering of the surface pressure by the coating flow under or around the bead 20d is prevented when the gasket is used for a long time.

In the gasket G, coatings 23a, 23b are formed on the outer surface of the upper plate 20. Namely, the coating 23a is formed on the main portion 20a, and the coating 23b is formed under the flange 20b. No coating is formed around the curved portion 20b. The coatings 23a, 23b are made of the same material as in the coating 22. The coatings 23a, 23b seal the gasket G relative to the cylinder head and cylinder block.

When the gasket G is situated between a cylinder head and a cylinder block (both not shown) and is tightened, the gasket G is compressed. The bead 20d is substantially completely compressed to provide high surface pressure thereat. The surface pressure of the bead 21c is greater than that of the bead 21e and less than that of the bead 20d.

Since the bead 21c is not completely compressed or flattened by the flange 20c, the surface pressure of the bead 21c is not significantly lowered when the gasket is used for a long time. Thus, even if the surface pressure of the bead 20d is lowered by plastic deformation of the bead 20d, the bead 21c can securely seal around the cylinder bore Hc. Also, the bead 21e securely seals around the water hole Hw. Since the coating 22 is formed between the upper and lower plates 20, 21, even if water leaks through the bead 21e, water does not substantially flow between the plates.

In the invention, in case the surface pressure of the beads are changed, the sizes, i.e. width and height, of the beads may be changed. Also, the thickness or hardness of the upper and lower plates 20, 21 may be changed. Therefore, the surface pressure around the holes can be adjusted easily according to the requirement of the gasket.

In the invention, the gasket is formed of two metal plates, but it is possible to provide appropriate different surface pressures around the cylinder bores and other holes. Also, the assembly of the plates can be made easy.

While the invention has been explained with reference to the specific embodiments of the invention, the explanation is illustrative, and the invention is limited only by the appended claims.

What is claimed is:

1. A metal laminate gasket for an internal combustion engine having a cylinder bore and a fluid hole to be sealed, comprising:

a first metal plate having a first hole corresponding to the cylinder bore of the engine, a main portion extending substantially throughout an entire area of the gasket, a second hole corresponding to the fluid hole of the engine and formed in the main portion, a curved portion extending from the main portion to define the first hole, a flange extending from the curved portion and situated under a part of the main portion, and a first bead formed in the main portion to surround the first hole, said first bead projecting toward the flange to be disposed above the flange, a second metal plate situated under the main portion and extending substantially throughout the entire area of the gasket, said second metal plate having a third hole in which said curved portion is located, an inner portion situated around the third hole and disposed on the flange, a second bead formed outside the inner portion and projecting in a same direction as in the first bead, said second bead surrounding the flange and projecting beyond the flange, and a fourth hole corresponding to the fluid hole of the engine and situated under the second hole, a third bead formed on one of the first and second metal plates to seal around the fluid hole of the engine, and a coating layer formed on at least one of the first and second metal plates at a side facing the other of the first and second metal plates, said coating layer being formed outside the flange relative to the cylinder bore.

2. A metal laminate gasket according to claim 1, wherein said third bead is formed on the second metal plate, and a spring constant of the third bead is less than a spring constant of the second bead.

3. A metal laminate gasket according to claim 2, further comprising an additional coating layer formed on an outer surface of the first metal plate, but not on the curved portion.

4. A metal laminate gasket according to claim 3, wherein said gasket consists essentially of said first and second metal plates and the coating layers.

* * * * *